United States Patent
Lee et al.

(10) Patent No.: US 8,925,456 B2
(45) Date of Patent: Jan. 6, 2015

(54) CLICHÉ, METHOD OF MANUFACTURING CLICHÉ, AND PATTERN FORMED BY ROLL PRINTING METHOD

(75) Inventors: Seung-Jun Lee, Yongin-si (KR); Jae-Hyuk Chang, Seongnam-si (KR); Hyun-Seok Kim, Anyang-si (KR); Sung Hee Lee, Seoul (KR); Gug-Rae Jo, Asan-si (KR); Sin Kwon, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 969 days.

(21) Appl. No.: 12/969,162

(22) Filed: Dec. 15, 2010

(65) Prior Publication Data
US 2012/0031290 A1     Feb. 9, 2012

(30) Foreign Application Priority Data
Aug. 9, 2010    (KR) ........................ 10-2010-0076618

(51) Int. Cl.
    *B41N 1/00*      (2006.01)
    *B41N 1/12*      (2006.01)
    *B41N 1/06*      (2006.01)
    *G02F 1/1345*    (2006.01)
    *B41M 1/10*     (2006.01)

(52) U.S. Cl.
    CPC .. *B41N 1/12* (2013.01); *B41N 1/06* (2013.01); *G02F 1/1345* (2013.01); *B41M 1/10* (2013.01); *B41N 1/00* (2013.01)
    USPC ....................................... 101/395; 101/401.1

(58) Field of Classification Search
    CPC .............. B41F 9/01; B41N 1/06; B41N 1/12; B41M 1/00; B41M 1/10
    USPC ............. 101/395, 401.1, 455, 453, 454, 456, 101/457, 463.1, 158, 170, 41
See application file for complete search history.

(56) References Cited

U.S. PATENT DOCUMENTS

| | | | |
|---|---|---|---|
| 6,835,583 B2 * | 12/2004 | Yi et al. | 438/30 |
| 2007/0177073 A1 * | 8/2007 | Seo et al. | 349/110 |
| 2008/0178756 A1 | 7/2008 | Nam et al. | |
| 2008/0190307 A1 | 8/2008 | Nam et al. | |

FOREIGN PATENT DOCUMENTS

| | | |
|---|---|---|
| JP | 2006-231827 | 9/2006 |
| JP | 2007-083408 | 4/2007 |
| JP | 2007-253344 | 10/2007 |
| JP | 2008-246829 | 10/2008 |
| JP | 2009-202340 | 9/2009 |
| JP | 2010-000673 | 1/2010 |
| KR | 10-2008-0060823 | 7/2008 |
| KR | 10-2009-0119358 | 11/2009 |
| KR | 10-2010-0009919 | 1/2010 |

* cited by examiner

*Primary Examiner* — Judy Nguyen
*Assistant Examiner* — Jennifer Simmons
(74) *Attorney, Agent, or Firm* — H.C. Park & Associates, PLC

(57) ABSTRACT

The present invention relates to a cliché, a manufacturing method of a cliché, and a pattern formed by a roll printing method to prevent deteriorations due to sagging and a disconnection of an end portion or a rounded angular portion, the cliché having a surface formed with a groove, wherein the end portion of the groove has a narrower width than the width of the center portion of the groove.

14 Claims, 14 Drawing Sheets a/b : 2/5 ~ 1/2 c/d : 1/3 ~ 1 e/f : 1/3 ~ 1 h/g : 1/6 ~ 1/3
j/i : 1/50 ~ 1 m/n : 2/5 ~ 1/2 p/o : 1/3 ~ 1 q/r : 1/3 ~ 1 t/s : 1/6 ~ 1/3
v/u : 1/50 ~ 1

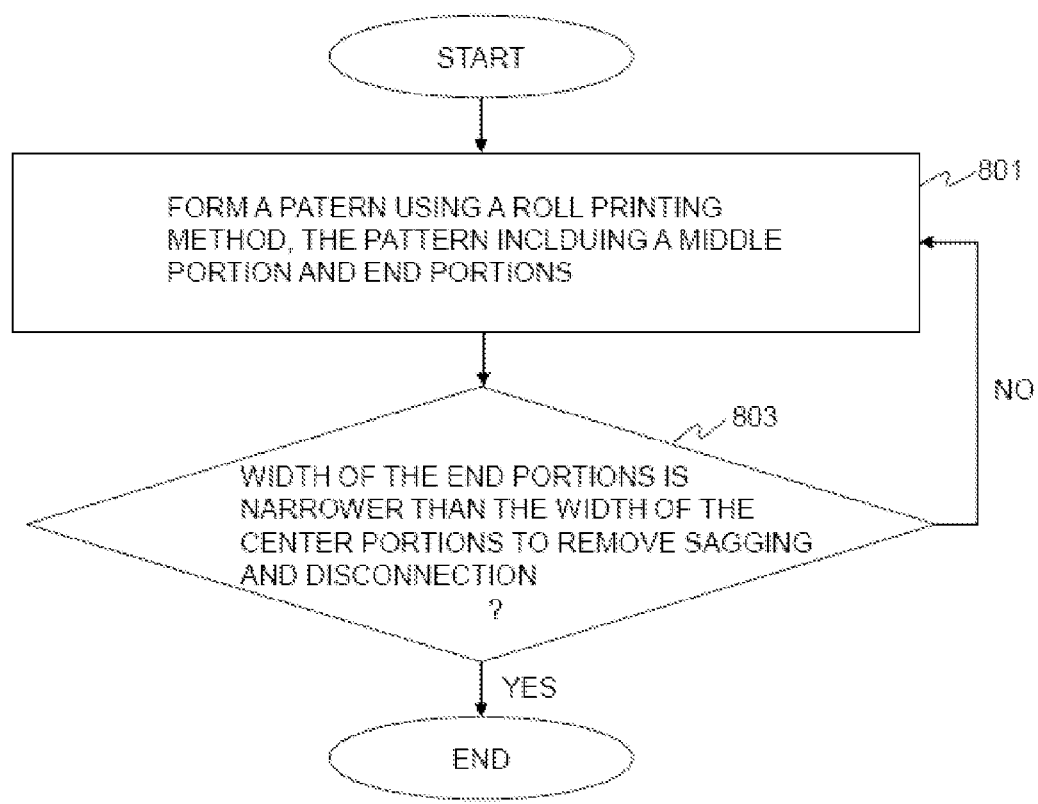

CLICHÉ, METHOD OF MANUFACTURING CLICHÉ, AND PATTERN FORMED BY ROLL PRINTING METHOD

CROSS-REFERENCE TO RELATED APPLICATION

This application claims priority to and the benefit of Korean Patent Application No. 10-2010-0076618 filed in the Korean Intellectual Property Office on Aug. 9, 2010, which is hereby incorporated by reference for all purposes as if fully set forth herein.

BACKGROUND OF THE INVENTION

1. Field of the Invention

Exemplary embodiments of the present invention relate to a cliché, a manufacturing method of a cliché, and a pattern formed by a roll printing method. More particularly, the present invention relates to preventing deterioration of a pattern due to sagging and a disconnection of an end portion or a rounded angular portion of the cliché.

2. Description of the Background

Liquid crystal displays (LCDs) have been adopted as one of the most widely used flat panel displays, and an LCD typically includes a pair of panels provided with field-generating electrodes and a liquid crystal (LC) layer interposed between the two panels. The LCD displays images by applying signals to the field-generating electrodes to generate an electric field in the LC layer that determines the orientation of LC molecules therein to adjust polarization of incident light.

For example, a liquid crystal display includes a thin film transistor array panel and a common electrode panel facing each other. The thin film transistor array panel may include a gate line transmitting a gate signal and a data line transmitting a data signal that intersect each other, a thin film transistor connected to the gate line and the data line, and a pixel electrode connected to the thin film transistor. The common electrode panel includes a light blocking member, a color filter, and a common electrode.

In a conventional liquid crystal display, two panels of the liquid crystal display may include a plurality of patterns, and these patterns are generally formed through a photo process and an etching process. However, high manufacturing costs associated with utilizing a mask to form a predetermined pattern for these processes and long process time due to complicated process are existing problems.

To solve these problems, an approach to form the pattern by using a printing method has been proposed, for example, inkjet printing, nano-imprinting, gravure printing, reverse offset printing, offset printing, and micro-contact printing.

Fir example, in the reverse offset printing and the offset printing methods that are one of the most commonly used methods, a pattern material is coated on the whole surface of a printing roll and then only a desired pattern is maintained and transferred to the substrate.

Unfortunately, these methods sometimes resulted in sagging problems generated when forming a pattern by a conventional roll printing method. Hence, it may be difficult to form a pattern of a desired shape.

In addition, in the process of removing an unnecessary portion for the pattern formation by using a cliché, if a groove of the cliché is shallow, the pattern material is attached inside the groove such that the portion for the pattern formation may be removed. If the groove of the cliché is very deep, the manufacturing process of the cliché may take a long time such that the surface of the cliché may be non-uniform.

Therefore, there is a need for an approach to solve these problems.

SUMMARY OF THE INVENTION

These and other needs are addressed by the present invention, in which exemplary embodiments of the present invention provide a cliché, a manufacturing method of a cliché associated with making a pattern formed by a roll printing method to prevent deteriorations due to sagging and a disconnection of an end portion or a rounded angular portion of the cliché.

Also, exemplary embodiments of the present invention provide a cliché and a manufacturing method of a cliché to prevent the pattern material from being attached inside the groove of the cliché and increasing the manufacturing process by uniformly etching the cliché.

Additional features of the exemplary embodiments will be set forth in the description which follows, and in part will be apparent from the description, or may be learned by practice of the invention.

Exemplary embodiments of the present invention disclose a cliché. The cliché includes a surface formed with a groove. And an end portion of the groove has a narrower width than the width of a center portion of the groove.

Exemplary embodiments of the present invention disclose a cliché. The cliché include a surface formed with a groove. And an end portion of the groove includes a "V" shape and the width of the groove is gradually decreased as closer to the endmost portion.

Exemplary embodiments of the present invention disclose a cliché. The cliché includes a surface formed with a groove. The end portion of the groove is divided into two endmost portions, and the width is gradually decreased as closer to the two endmost portions, thereby forming a "W" shape.

Exemplary embodiments of the present invention disclose a cliché. The cliché includes a surface formed with a groove. The width of the end portion of the groove is decreased in stages, thereby forming a funnel shape. The funnel shape includes a conical shaped portion including a first width and a narrow stem portion including a second width that is less than the first width.

Exemplary embodiments of the present invention disclose a cliché. The cliché includes a surface formed with a groove to form a pattern of a display device which includes a display area and a non-display area using a roll printing method. The groove used to form the non-display area includes a narrower width than the width of the groove used to form the display area.

Exemplary embodiments of the present invention disclose a cliché. The cliché includes a surface formed with a groove to form a pattern of a display device which includes a display area and a non-display area using a roll printing method. The groove is used to form the non-display area comprises a narrower width than the width of the groove used to form the display area.

Exemplary embodiments of the present invention disclose a method of manufacturing a cliché comprising a surface formed with a groove. The method includes disposing a partition layer on the whole surface of a plate. The method also includes patterning the partition layer using a photolithography process. The method includes etching the plate using the partition layer as a mask to form the groove. The method further includes removing the partition layer. The end portion of the groove has a narrower width than the width of the center portion of the groove.

Exemplary embodiments of the present invention disclose a pattern. The pattern comprises a center portion and an end portion formed by a roll printing method. The end portion of the pattern includes a narrower width than the width of the center portion of the pattern.

Exemplary embodiments of the present invention disclose a pattern formed using a roll printing method. An end portion of the pattern comprises a width that is gradually decreased as closer to an endmost portion of the pattern thereby forming a "V" shape.

Exemplary embodiments of the present invention disclose a pattern formed using a roll printing method. The end portion of the pattern is divided into two endmost portions, and the width is gradually decreased as closer to the two endmost portions thereby forming a "W" shape.

Exemplary embodiments of the present invention disclose a pattern formed using a roll printing method. The end portion of the pattern is decreased in stages forming a funnel shape. The funnel shape comprises a conical shaped portion comprising a first width and a narrow stem portion comprising a second width that is less than the first width.

Exemplary embodiments of the present invention disclose a pattern formed using a roll printing method in a display device comprising a display area and a non-display area. The pattern formed in the non-display area comprises a narrower width than the width of the pattern formed in the display area.

Exemplary embodiments of the present invention disclose a method. The method includes forming a pattern using a roll printing method. The pattern includes a middle portion and an end portion which includes various shapes, wherein a width of the end portions is narrower than a width of the center portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 12B is flowchart of a process for forming a pattern according to exemplary embodiments of the present invention.

DETAILED DESCRIPTION OF THE ILLUSTRATED EMBODIMENTS

Figure 1:
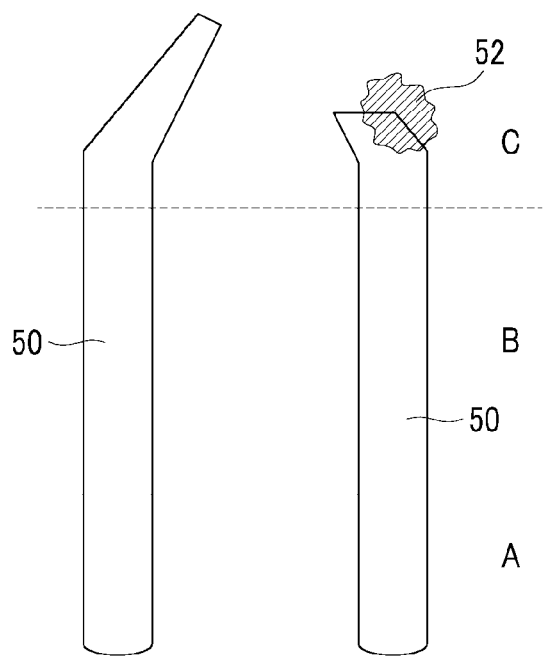
FIG. 1 is a top plan view of a pattern formed by a conventional roll printing method.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a top plan view of a pattern formed by a conventional roll printing method.

In this background example, in the process in which a printing roll is rotated on a substrate to transfer a pattern material to the substrate, an edge is formed with a rounded angular portion at a starting portion A of a pattern 50, the pattern sags at a final portion C of the pattern 50 and is finally disconnected if the pattern sags for more than a predetermined length, and a disconnected pattern material 52 is attached to another pattern 50 such that the thickness of the pattern 50 is increased to about double, and as a result, it is difficult to form a pattern of a desired shape.

As following, a method of forming a pattern by a roll printing method is described for better understanding of a cliché of to the present invention.

Figure 2A:
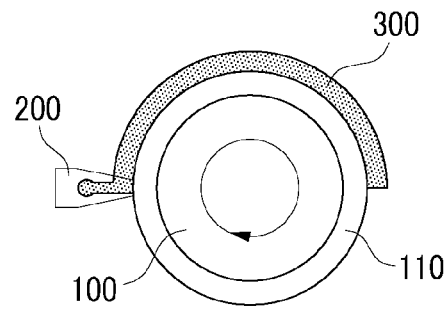
FIG. 2A, FIG. 2B and FIG. 2C are cross-sectional views showing a method of forming a pattern according to exemplary embodiments of the present invention.
Figure 2B:
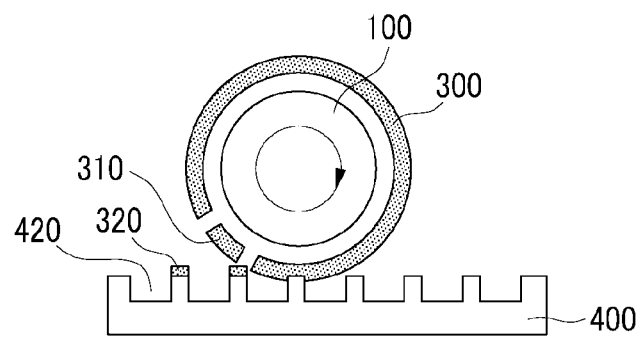
Figure 2C:
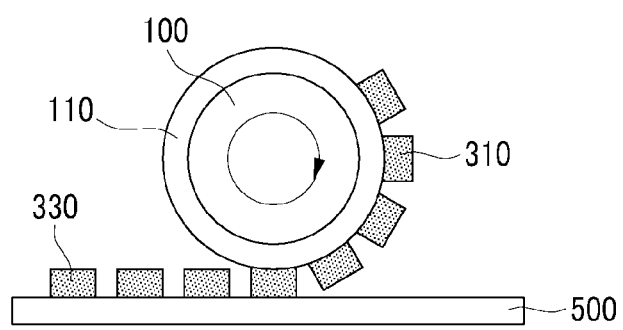

FIG. 2A, FIG. 2B and FIG. 2C are cross-sectional views showing a method of forming a pattern according to exemplary embodiments of the present invention.

As shown in FIG. 2A, a pattern material 300 is coated on a printing roll 100 by using a nozzle 200. While the nozzle 200 is being stopped, the pattern material 300 is emitted outside and the emitted pattern material 300 is coated on the printing roll 100 as the printing roll 100 is rotating.

In this example, the printing roll 100 may further include a blanket 110 enclosing the surface of the printing roll 100, and the pattern material 300 may be coated on the blanket 110.

As shown in FIG. 2B, a portion for pattern formation 310 is remained and an unnecessary portion for pattern formation 320 is removed from the pattern material 300 on the printing roll 100 by using a cliché 400.

In this example, grooves 420 are formed on the upper surface of the cliché 400, and if the printing roll 100 is rotated on the upper surface of the cliché 400, the unnecessary portion for the pattern formation 320 is attached thereto by applying a predetermined pressure to the cliché 400.

As shown in FIG. 2C, the printing roll 100 is rotated on a substrate 500 such that the pattern material 310 remaining on the printing roll 100 is transferred to the substrate 500 to form a pattern 330. The pattern 330 transferred on the substrate 500 is hardened to form the pattern 330.

Figure 3:
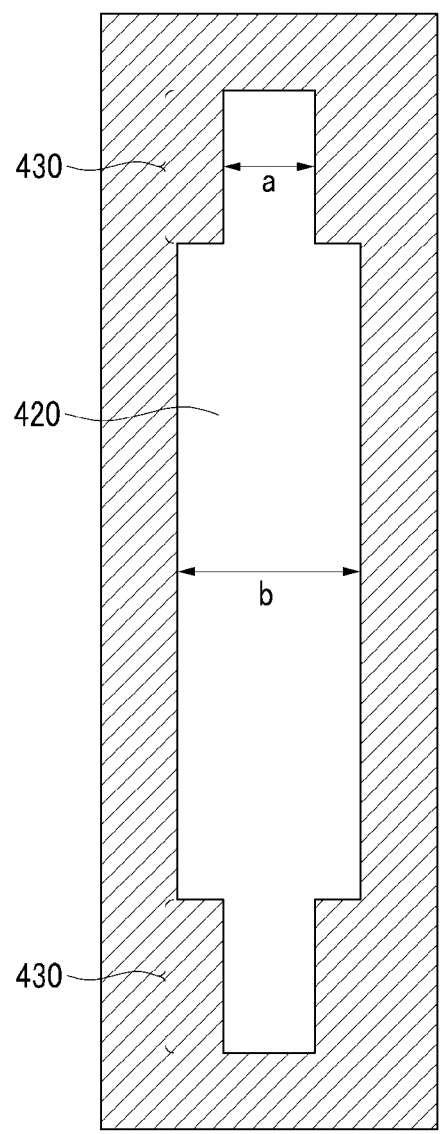
FIG. 3 is a top plan view showing a cliché according to exemplary embodiments of the present invention.

FIG. 3 is a top plan view showing a cliché according to exemplary embodiments of the present invention.

A cliché 400 includes grooves 420 formed on one surface, and the width of an end portion 430 of the groove 420 is narrower than the width of the center portion of the groove 420. In this example, the ratio of the width a of the end portion 430 of the groove 420 for the width b of the center portion of the groove 420 may be in the range of more than about 2:5 and less than about 1:2.

Figure 4:
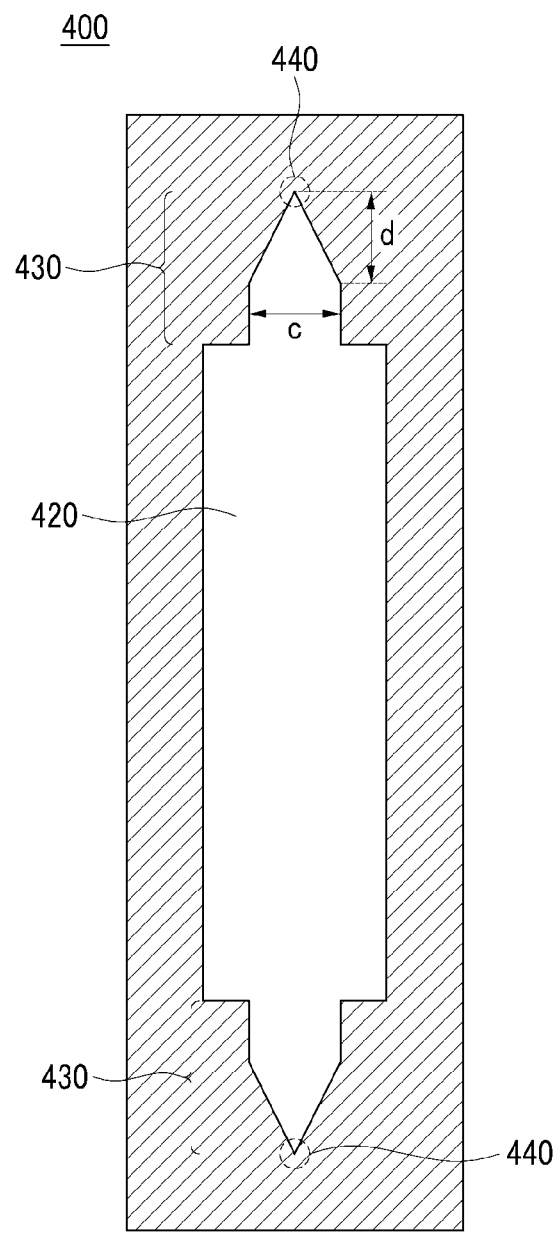
FIG. 4 is a top plan view showing a cliché according to exemplary embodiments of the present invention.

FIG. 4 is a top plan view showing a cliché according to exemplary embodiments of the present invention.

A cliché 400 includes grooves 420 formed on one surface, and the width of the end portion 430 of the groove 420 is decreasing as it is closer to an endmost portion 440, thereby forming a "V" shape. In this example, the ratio of the width c of the end portion 430 of the groove 420 to the length d which is from the position where the width of the groove 420 starts to be decreased to the endmost portion 440 of the groove 420 may be in the range of more than about 1:3 and less than about 1:1.

As shown, the end portion 430 of the groove 420 may be narrower than the center portion of the groove 420. Alternatively, it is contemplated that a uniform width may be maintained from the center portion of the groove 420 to the end portion 430 of the groove 420, from which the width of the end portion 430 may be gradually decreased thereby forming the "V" shape.

Figure 5:
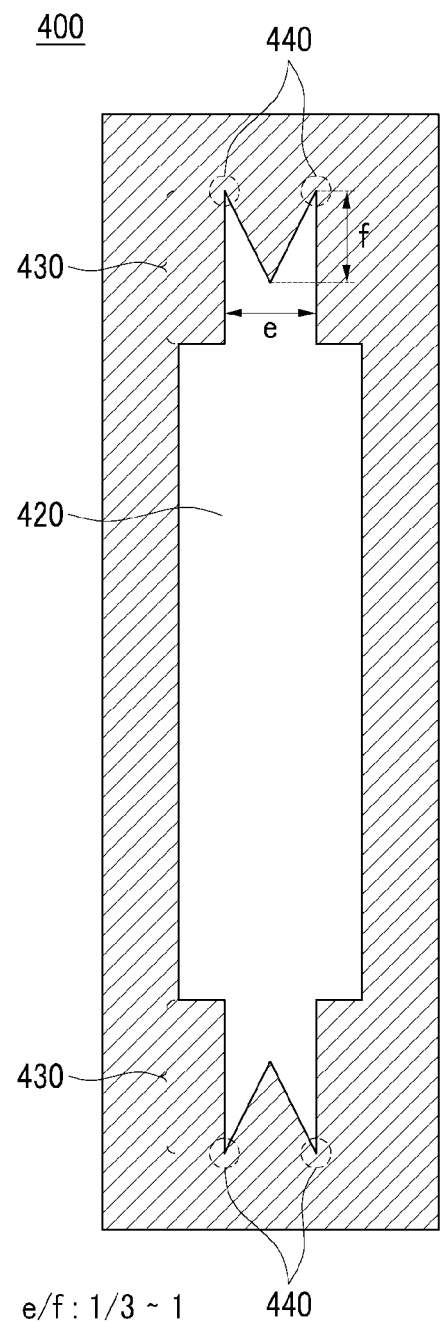
FIG. 5 is a top plan view showing a cliché according to exemplary embodiments of the present invention.

FIG. 5 is a top plan view showing a cliché according to exemplary embodiments of the present invention.

A cliché 400 includes grooves 420 formed on one surface, and the end portion 430 of the grooves 420 is divided into two endmost portions 440 and the width of the end portion 430 is decreased as it is closer to the two endmost portions 440, thereby forming a "W" shape. In this example, the ratio of the width of the end portion 430 of the groove 420 to the length f from the position where the end portion 430 is divided to the endmost portion 440 of the groove may be in the range of more than about 1:3 and less than about 1:1.

As shown, the end portion 430 of the groove 420 may be narrower than the center portion of the groove 420. Alternatively, the uniform width may be maintained from the center portion of the groove 420 to the end portion 430 of the groove 420 from which the width of the end portion 430 may be gradually decreased as it is closer to the two endmost portions 440, thereby forming the "W" shape.

Figure 6:
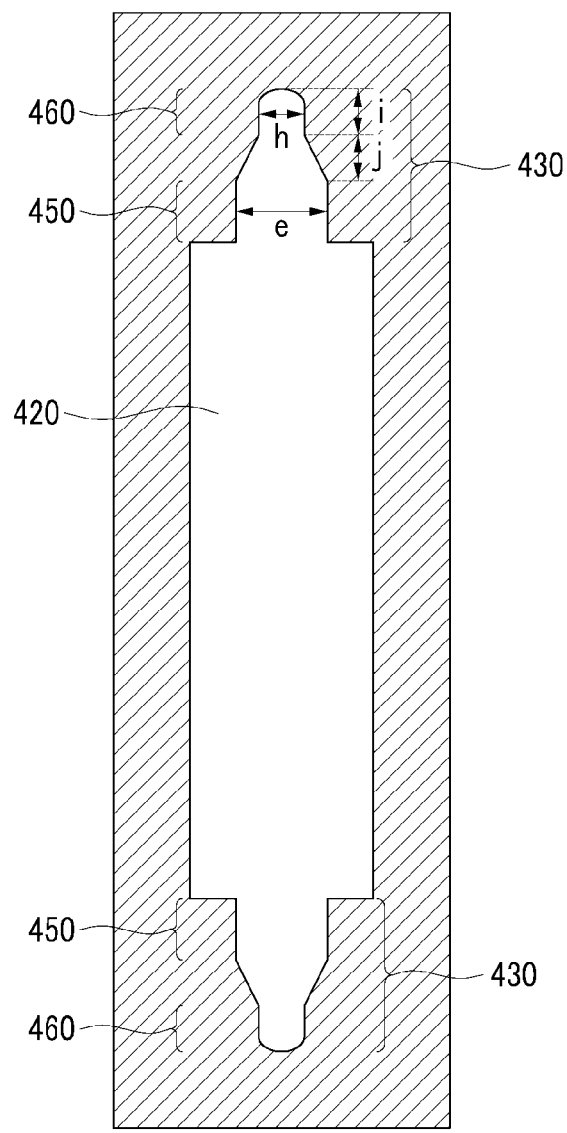
FIG. 6 is a top plan view showing a cliché according to the exemplary embodiments of the present invention.

FIG. 6 is a top plan view showing a cliché according to exemplary embodiments of the present invention.

A cliché 400 includes grooves 420 formed on one surface, and the end portion 430 of the groove 420 has a width that is decreased in stages, thereby forming a funnel shape, and includes a conical shaped portion ('a first portion 450') having a first width e and a narrow stem portion ('second portion 460') having a second width h that is narrower than the first width e. In this example, the ratio of the second width h to the first width e may be in the range of more than about 1:6 and less than about 1:3. Also, the ratio of the length j between the first portion 450 and the second portion 460 to the length i of the second portion 460 may be in the range of more than about 1:50 and less than about 1:1.

As shown, the end portion 430 of the groove 420 may be narrower than the center portion of the groove 420. Alternatively, the uniform width may be maintained from the center portion of the groove 420 to the end portion 430 of the groove 420 from which the width of the end portion 430 may be gradually decreased in stages, thereby forming the funnel shape.

FIG. 3, FIG. 4, FIG. 5 and FIG. 6 show exemplary shapes in which the width of both ends of the cliché are decreased, however the present invention is not limited thereto, and the width of either of one end portion may be decreased by way of configurations.

According to exemplary embodiments, the cliché of the present invention may be applied to form a pattern for a display device such as a semiconductor element by a roll printing method.

As an example of a display device, a liquid crystal display may include a thin film transistor array panel and a common electrode panel facing each other. The thin film transistor array panel may include a gate line transmitting a gate signal and a data line transmitting a data signal that intersect each other, a thin film transistor coupled to the gate line and the data line, and a pixel electrode coupled to the thin film transistor. The common electrode panel may include a light blocking member, a color filter, and a common electrode.

The method of forming the pattern as described above in FIG. 2A, FIG. 2B and FIG. 2C may be applied to form various patterns. For example, the display device may include a display area and a non-display area enclosing the display area, and the cliché used to form the pattern of the display device may have one surface formed with the groove. In this example, the groove used to form the non-display area has a width that is narrower than the width of the groove used to form the display area. Also, the various shapes of the end portions of the cliché discussed in the exemplary embodiments of the present invention may be applied to the shape of the groove used to form a non-display area.

In some examples, to form the pattern using the roll printing method, the printing roll is rotated from the non-display area corresponding to the outer of the substrate to the non-display area of the other side by passing the display area corresponding to the center portion of the substrate to form the pattern. It is noted that although the width of the pattern is decreased in the non-display areas as being compared with the corresponding display area, the non-display areas being defined where the rotation of the printing roll is started and finished, the change of the width does not affect the display of the images to the outside.

FIG. 7A, FIG. 7B, FIG. 7C and FIG. 7D are cross-sectional views showing a manufacturing method of a cliché according to exemplary embodiments of the present invention.

Figure 7A:
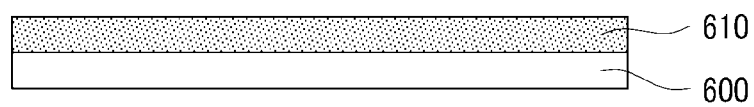
FIG. 7A, FIG. 7B, FIG. 7C and FIG. 7D are cross-sectional views showing a manufacturing method of a cliché according to exemplary embodiments of the present invention.

As shown in FIG. 7A, a partition layer 610 is formed on the whole surface of a glass plate 600.

The partition layer 610 may be formed with a singular or multi-layered structure by using at least one material of a polymer material or a metal material. The polymer material may be an acryl-based, an epoxy-based, a novolac-based, an acryl-epoxy-based copolymer, a novolac-acryl-based, novolac-epoxy hybrid-base material, or any combinations thereof and the metal material may be copper, chromium, chromium oxide, molybdenum, aluminum, silver, gold, titanium, or any combinations thereof.

In some examples, the partition layer 610 has a thickness more than about 500 Å less than about 30,000 Å. The partition layer 610 is an element used as a mask to etch the plate 600, and if the thickness is very thin, the partition layer 610 is damaged in the step of etching the plate 600 such that it may not have the function of the mask. By contrast, if the thickness is thick, a long time is required when removing the partition layer 610 such that it is preferable that the partition layer 610 has the thickness of a threshold range.

Figure 7B:
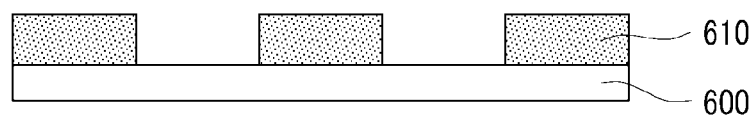

As shown in FIG. 7B, the partition layer 610 is patterned through a photolithography process.

Figure 7C:
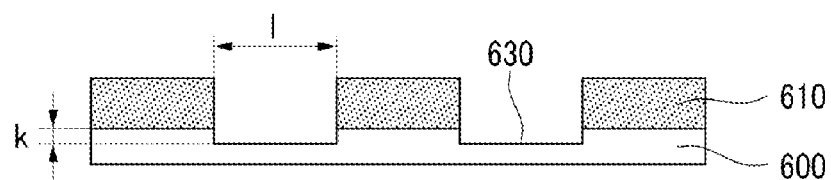

In this example, the partition layer 610 is etched such that the end portion of a groove 630 (FIG. 7C) that will be formed in the plate 600 by using the partition layer 610 as the mask has a width that is narrower than the center of the groove 630 (FIG. 7C). Also, the partition layer 610 is patterned for the end portion of the groove 630 (FIG. 7C) to have the various shapes according to exemplary embodiments of the present invention.

As shown in FIG. 7C, the plate 600 is etched by using the patterned partition layer 610 as the mask to form the groove 630.

In this example, the ratio of the depth k of the groove 630 to the width l of the groove 630 may be in the range of more than about 1:6 and less than about 1:3. If the ratio of the depth k of the groove 630 for the width l of the groove 630 is less than about 1:6, the pattern material is attached inside the groove 630 when rotating the printing roll on the cliché. If the ratio is more than about 1:3, a long time is required for the etching of the plate 600 such that the cliché is non-uniformly etched and the pattern may be non-uniform, and thereby the groove 630 may preferably be etched in the ranges.

Figure 7D:
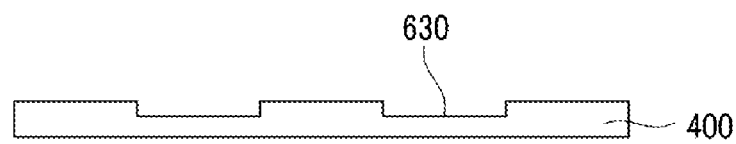

As shown in FIG. 7D, after forming the groove 630, if the partition layer 610 is removed, a cliché having a groove formed on one surface is formed.

Figure 8:
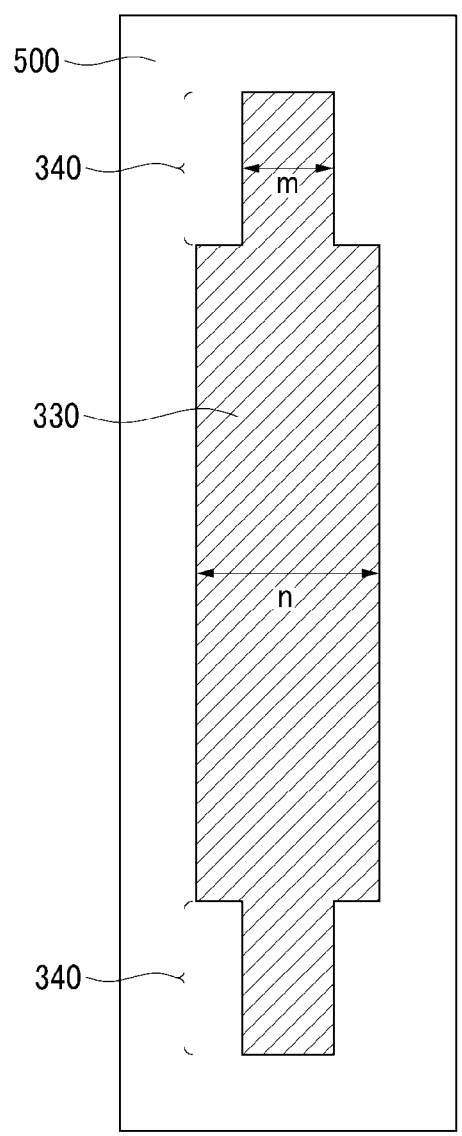
FIG. 8 is a top plan view of a pattern using the cliché of FIG. 3.

FIG. 8 is a top plan view of a pattern using the cliché of FIG. 3.

For example, a pattern 330 is formed on a substrate 500, and the width of an end portion 340 of the pattern 330 is narrower than the width of the center portion of the pattern 330. In this example, the ratio of the width m of the end portion 340 of the pattern 330 to the width n of the center portion of the pattern 330 may be in the range of more than about 2:5 and less than about 1:2.

Figure 9:
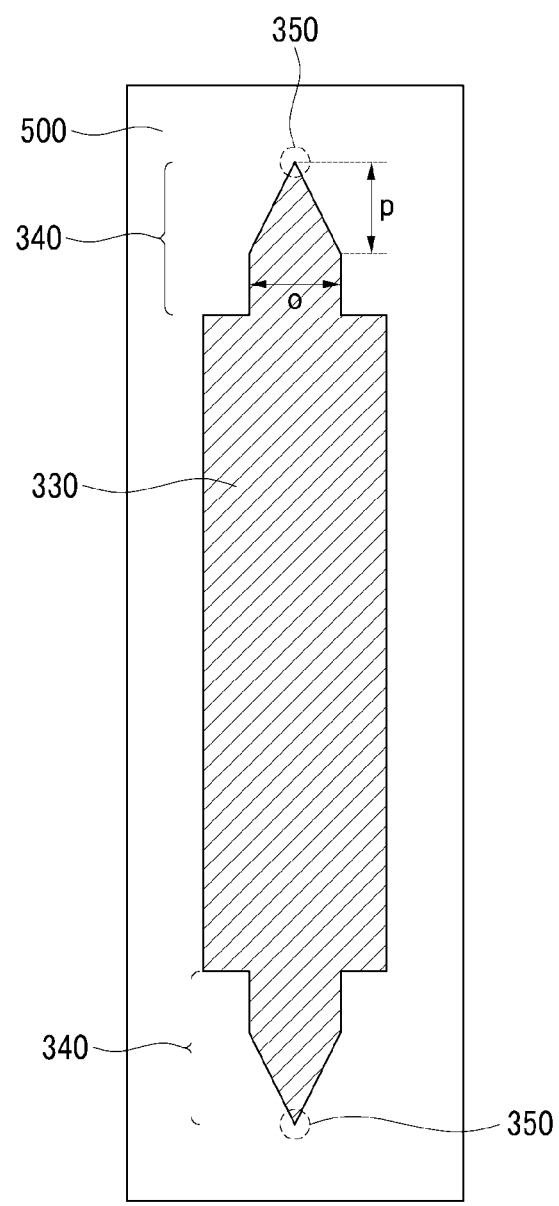
FIG. 9 is a top plan view of a pattern using the cliché of FIG. 4.

FIG. 9 is a top plan view of a pattern using the cliché of FIG. 4.

A pattern 330 is formed on a substrate 500, and the width of an end portion 340 of the pattern 330 is decreased as it is closer to an endmost portion 350 of the pattern 330, thereby forming a "V" shape. In this example, the ratio of the width o of the end portion 340 of the pattern 330 to the length p from the position where the width of the pattern 330 starts to be decreased to the endmost portion 350 of the pattern 330 may be in the range of more than about 1:3 and less than about 1:1.

As shown, the width of the end portion 340 of the pattern 330 may be narrower than the width of the center portion of the pattern 330. Alternatively, the uniform width may be maintained from the center portion of the pattern 330 to the end portion 340 of the pattern 330 from which the width of the end portion 340 of the pattern 330 may be decreased, thereby forming the "V" shape.

Figure 10:
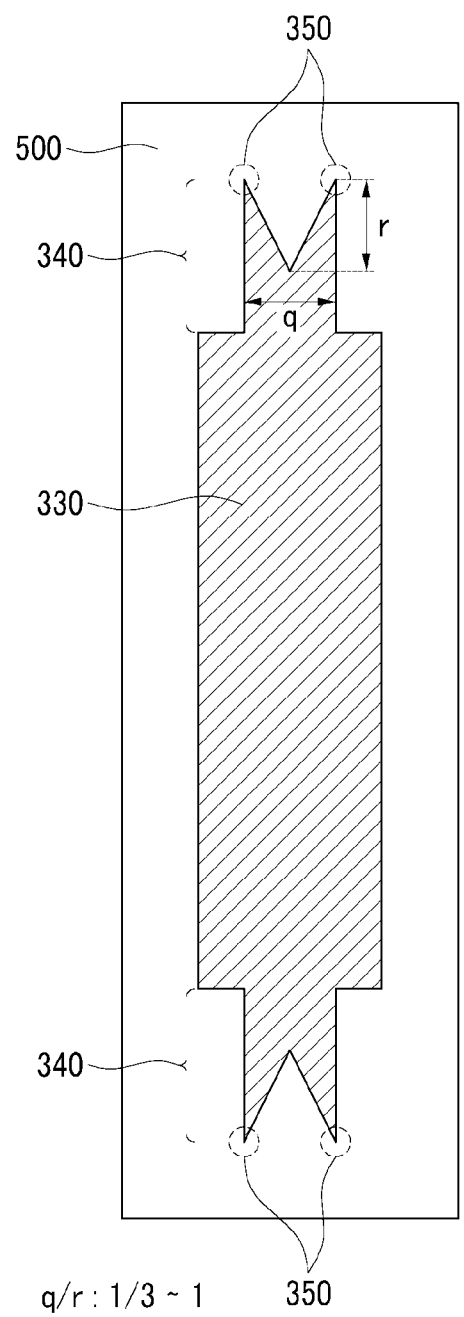
FIG. 10 is a top plan view of a pattern using the cliché of FIG. 5.

FIG. 10 is a top plan view of a pattern using the cliché of FIG. 5.

A pattern 330 is formed on a substrate 500, and an end portion 340 of the pattern 330 is divided into two endmost portions 350, and the width is decreased closer to the two endmost portions 350 thereby forming a "W" shape. In this example, the ratio of the width q of the end portion 340 of the pattern 330 to the length r from the position where the end portion 340 of the pattern 330 is divided to the endmost portion 350 of the pattern 330 may be in the range of more than about 1:3 and less than about 1:1.

As shown, the width of the end portion 340 of the pattern 330 may be narrower than the width of the center portion of the pattern 330. Alternatively, the uniform width may be maintained from the center portion of the pattern 330 to the end portion 340 of the pattern 330 from which the width of the end portion 340 of the pattern 330 may be decreased closer to the two endmost portions 350 thereby forming the "W" shape.

Figure 11:
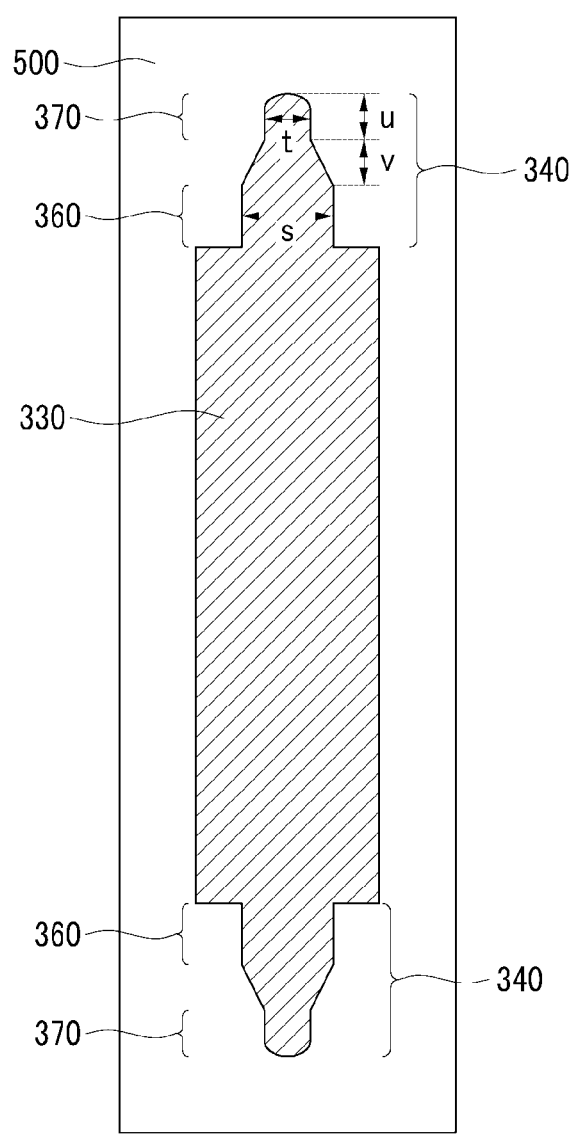
FIG. 11 is a top plan view of a pattern using the cliché of FIG. 6.

FIG. 11 is a top plan view of a pattern using the cliché of FIG. 6.

A pattern 330 is formed on a substrate 500, and the width of an end portion 340 of a pattern 330 is decreased in stages thereby forming the funnel shape, and includes a conical shaped portion ('a first portion 360') having a first width s and a narrow stem portion ('second portion 370') having a second width t that is less than the first width s. In this example, the ratio of the second width to the first width s may be more than about 1:6 and less than about 1:3. Also, the ratio of the length v between the first portion 360 and the second portion 370 for the length u of the second portion 370 may be more than about 1:50 and less than about 1:1.

As shown, the width of the end portion 340 of the pattern 330 may be narrower than the width of the center portion of the pattern 330. Alternatively, the uniform width may be maintained from the center portion of the pattern 330 to the end portion 340 of the pattern 330 from which the width of the end portion 340 may be decreased in stages thereby forming the funnel shape.

FIG. 8, FIG. 9, FIG. 10 and FIG. 11 show that the end portions of both sides of the pattern has the decreased width, however the present invention is not limited thereto, and the width of the either of only one side of the end portion may be decreased by way of configurations.

According to exemplary embodiments, the pattern of the present invention may be the pattern included in the display device and the semiconductor element and formed by roll printing.

In some examples, the display device may include a display area and a non-display area enclosing the display area, and the pattern of the non-display area has the width that is narrower than the width of the pattern formed in the display area. Also, the various shapes of the end portion of the pattern according to exemplary embodiments of the present invention may be applied to the pattern of the non-display area.

For example, when forming the pattern by using the roll printing method, the printing roll starts from the non-display area corresponding to the outer portion of the substrate, passes by the display area corresponding to the center portion of the substrate, and arrives at the non-display area while the printing roll is rotated to form the pattern. Although the width of the non-display area as the portion where the rotation of the printing roll starts and finishes is decreased compared with the display area, the change of the width does not affect the display of the images outside.

Figure 12A:
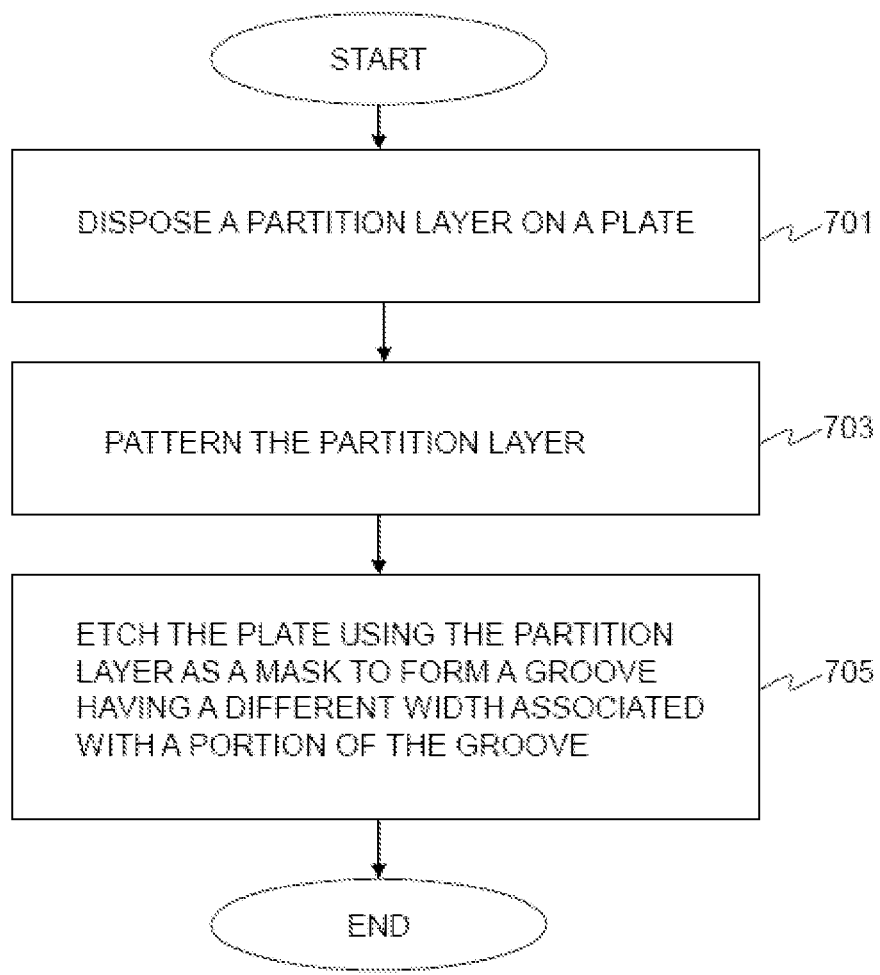
FIG. 12A is a flowchart of a process of manufacturing a cliché according to exemplary embodiments of the present invention.

FIG. 12 A is a flowchart of a process of manufacturing a cliché according to exemplary embodiments of the present invention. As in step 701, a partition layer is formed on the whole surface of a plate. The partition layer is patterned, per step 703 using a photolithograph process. The plate is etched using the partition layer as a mask to form a groove as in step 705. Then, a portion of the partition layer is removed, per step 705. When patterning the partition layer to from a groove, an end portion of the groove has narrower width than the width of the center portion of the groove to eliminate problems die to sagging and a disconnection associated with the end portion. According to exemplary embodiments, plurality of shapes of grooves can be patterned and are used for a liquid crystal display which includes a plurality of patterns using various photolithographic and etching processes.

FIG. 12 B is flowchart of a process for forming a pattern according to exemplary embodiments of the present invention. As in step 801, a pattern is formed using a roll printing method. The pattern includes a middle portion and end portions. The end portion includes various shaped patterns including but not limited to a V-shaped pattern, a W-shaped pattern and a funnel-shaped pattern by way of configurations. Each of the patterns is formed in which a width of the end portion of the pattern is narrower than the width of the center portion. In step 803, the width is determined whether the width of the end portion is sufficiently narrower than the width of the corresponding center portion in order to remove sagging and disconnection problems. According to exemplary embodiments, the various shaped patterns may be formed at one side of the end portions of the pattern or both sides of the pattern, by way of configurations.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A cliché for use in printing an LCD display wherein the cliché is configured to form a pattern on a printing roll by removing an unnecessary portion of a pattern material from the printing roll when the printing roll is rolled across the cliché, the cliché comprising:
   a surface comprising a plurality of grooves having substantially the same configuration, each groove comprising:
   a mid portion; and
   rod-shaped end portions disposed on opposite ends of the mid portion,
   wherein the width of the end portions is narrower than the width of the mid portion, and
   wherein the width of the mid portion is uniform
   such that, when the printing roll is rolled across the cliché, sagging and disconnection of an end portion of the pattern material is prevented.

2. The cliché of claim 1, wherein
   the ratio of the width of the end portions of the groove to the width of the mid portion of the groove is more than about 2:5 and less than about 1:2.

3. A cliché for use in printing an LCD display wherein the cliché is configured to form a pattern on a printing roll by removing an unnecessary portion of a pattern material from the printing roll when the printing roll is rolled across the cliché, the cliché comprising:
   a surface comprising a plurality of grooves having substantially the same configuration, each groove comprising:
   a mid portion; and
   symmetrical end portions disposed on opposite ends of the mid portion,
   wherein the width of the end portions is narrower than the width of the mid portion, wherein the width of the mid portion is uniform, and wherein an end portion of the groove comprises a "V" shape and an endmost portion of the groove comprises a gradually decreasing width such that, when the printing roll is rolled across the cliché, sagging and disconnection of an end portion of the pattern material is prevented.

4. The cliché of claim 3, wherein the ratio of the width of the end portion of the groove to a length from a position where the width of the groove starts to decrease to the endmost portion of the groove is more than about 1:3 and less than about 1:1.

5. A cliché for use in printing an LCD display wherein the cliché is configured to form a pattern on a printing roll by removing an unnecessary portion of a pattern material from the printing roll when the printing roll is rolled across the cliché, the cliché comprising:
   a surface comprising a plurality of grooves having substantially the same configuration, each groove comprising:
   a mid portion; and
   symmetrical end portions disposed on opposite ends of the mid portion,
   wherein the width of the end portions is narrower than the width of the mid portion, wherein the width of the mid portion is uniform, and wherein an end portion of the groove is divided into two endmost portions, and widths of the two endmost portions gradually decrease, thereby forming a "W" shape such that, when the printing roll is rolled across the cliché, sagging and disconnection of an end portion of the pattern material is prevented.

6. The cliché of claim 5, wherein
   the ratio of the width of the end portion of the groove to a length from a position where the end portion starts to be divided to the endmost portion is more than about 1:3 and less than about 1:1.

7. A cliché for use in printing an LCD display wherein the cliché is configured to form a pattern on a printing roll by removing an unnecessary portion of a pattern material from the printing roll when the printing roll is rolled across the cliché, the cliché comprising:
   a surface comprising a plurality of grooves having substantially the same configuration, each groove comprising:
   a mid portion; and
   symmetrical end portions disposed on opposite ends of the mid portion,
   wherein the width of the end portions is narrower than the width of the mid portion, wherein the width of the mid portion is uniform, and wherein a width of an end portion of the groove decreases in stages, thereby forming a funnel shape, wherein the funnel shape comprises a conical shaped portion comprising a first width and a narrow stem portion comprising a second width that is less than the first width such that, when the printing roll is rolled across the cliché, sagging and disconnection of an end portion of the pattern material is prevented.

8. The cliché of claim 7, wherein
   the ratio of the second width to the first width is more than about 1:6 and less than about 1:3.

9. The cliché of claim 7, wherein the ratio of the length between the conical shaped portion and the narrow stem portion to the length of the second portion is more than about 1:50 and less than about 1:1.

10. The cliché of claim 7, wherein
    the ratio of the depth of the groove to the width of the groove is more than about 1:6 and less than about 1:3.

11. A cliché for use in printing an LCD display wherein the cliché is configured to form a pattern on a printing roll by removing an unnecessary portion of a pattern material from the printing roll when the printing roll is rolled across the cliché, the cliché comprising:
    a surface comprising a plurality of grooves having substantially the same configuration to form a pattern of a display device comprising a display area and a non-display area using a roll printing method, each groove comprising:
    a mid portion; and
    symmetrical end portions disposed on opposite ends of the mid portion,
    wherein the width of the end portions is narrower than the width of the mid portion, wherein the width of the mid portion is uniform, such that, when the printing roll is rolled across the cliché, sagging and disconnection of an end portion of the pattern material is prevented wherein end portions of each groove are used to form the non-display area and comprise a narrower width than the width of the mid portion which is used to form the display area.

12. The cliché of claim 11, wherein a width of each of the end portions gradually decrease as closer to an endmost portion of each groove, thereby forming a "V" shape.

13. The cliché of claim 11, wherein each of the end portions is divided into two endmost portions, and widths of the two endmost portions gradually decrease, thereby forming a "W" shape.

14. The cliché of claim 11, wherein a width of each of the end portions decreases in stages thereby forming a funnel shape, and comprises a conical shaped portion comprising a first width and a narrow stem portion comprising a second width that is less than the first width.

\* \* \* \* \*